(12) United States Patent
He et al.

(10) Patent No.: US 9,417,076 B2
(45) Date of Patent: Aug. 16, 2016

(54) TOTAL ROUTE SCORE TO MEASURE QUALITY OF MAP CONTENT

(71) Applicant: HERE Global B.V., Veldhoven (NL)

(72) Inventors: Michael He, Westchester, IL (US); Roy Casino, Mundelein, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 14/584,313

(22) Filed: Dec. 29, 2014

(65) Prior Publication Data

US 2016/0187146 A1   Jun. 30, 2016

(51) Int. Cl.
*G01C 21/26* (2006.01)
*G01C 21/30* (2006.01)

(52) U.S. Cl.
CPC ............... *G01C 21/26* (2013.01); *G01C 21/30* (2013.01)

(58) Field of Classification Search
CPC ........ G01C 21/26; G01C 21/30; G01C 21/32; G06F 17/30371
See application file for complete search history.

(56) References Cited

U.S. PATENT DOCUMENTS

| | | | |
|---|---|---|---|
| 6,853,913 B2 * | 2/2005 | Cherveny | G01C 21/26 340/988 |
| 7,050,905 B2 | 5/2006 | Nemeth | |
| 7,529,639 B2 | 5/2009 | Rasanen et al. | |
| 7,957,893 B2 * | 6/2011 | Smartt | G01C 21/32 701/450 |
| 2009/0048775 A1 * | 2/2009 | Okude | G01C 21/3484 701/533 |
| 2011/0137551 A1 * | 6/2011 | Peri | G01C 21/3453 701/533 |
| 2012/0209818 A1 * | 8/2012 | Richter | G06F 17/30371 707/690 |
| 2012/0254707 A1 * | 10/2012 | Cooke | G01C 21/32 714/799 |
| 2013/0245932 A1 | 9/2013 | Beaurepaire et al. | |

* cited by examiner

*Primary Examiner* — Michael J Zanelli
(74) *Attorney, Agent, or Firm* — Lempia Summerfield Katz LLC (57) ABSTRACT

Systems, methods, and apparatuses are described for total route scores to measure quality of map content. Test data is received for a region of interest. The test data may be matched to routes formed from road links stored in a database. Frequency weights may be assigned to the test data based on the frequency of usage for the road links. The routes in the database may be compared to the traveled routes in the test data. Using this comparison, one or more errors in the database may be identified. A total route score for the region of interest may calculated from the errors and frequency weights.

20 Claims, 9 Drawing Sheets

TOTAL ROUTE SCORE TO MEASURE QUALITY OF MAP CONTENT

FIELD

The following disclosure relates to applications for measuring the quality of map content, or more particularly, systems and algorithms for calculating and reporting total route scores from real world testing data and historical route data.

BACKGROUND

Navigation systems and devices provide traffic data, such as the existence or location of particular attributes on routes that a user may be travelling. In order to provide these features, navigation systems use geographic data that may include information about the routes drivers may be traveling on, detailed information regarding the network of roads and intersections, estimated travel times along road segments, the speed limits along roads, and other information useful for selecting one route over another.

The verification of attributes on route may be a significant undertaking. However, the correctness of attributes has a direct bearing on the quality measurement of a map. Additionally, present map quality measuring systems present metrics about the many attributes that may describe map quality. This presentation may result in information overload for users and make it difficult to discern the contextual importance of one route over another route.

Accordingly, end users who have navigation systems may discover that certain traffic data used in their navigation systems does not provide sufficient context. Therefore, providing correct traffic data, such as for use in navigation systems, is a continuing effort.

SUMMARY

Systems, methods, and apparatuses are described for total route scores to measure quality of map content. Test data is received for a region of interest. The test data may be matched to routes formed from road links stored in a database. Frequency weights may be assigned to the test data based on the frequency of usage for the road links. The routes in the database may be compared to the traveled routes in the test data. Using this comparison, one or more errors in the database may be identified. A total route score for the region of interest may be calculated from the errors and frequency weights.

BRIEF DESCRIPTION OF THE DRAWINGS

Exemplary embodiments are described herein with reference to the following drawings.

DETAILED DESCRIPTION

The following embodiments relate to a method to measure and quantify the quality of a map database. Measuring the quality of a map database historically is achieved by measuring the quality of individual attributes of the map (such as geometry or signage) and the quality historically treats all errors equally (an error in quality in a high usage area is not differentiated from an error in a low usage area). A total route score may be used to better address errors in map quality according to route usage. A total route score uses the quality information for many separate map attributes, aggregates those attributes into a single metric through the "eyes" of a routing experience, weights the attributes by route usage or route selection, or both, (more used roads weight more heavily in the metric) in order to deliver a single number that indicates the quality of the map by making a statement on the map content ability to deliver a successful route.

The following embodiments provide systems and methods for calculating a total route score. A method, apparatus, and system are provided which calculate a total route score for a region of interest to determine the quality of map content in a region. Users are familiar with map quality being determined by particular attributes, but often time the amount of attributes presented may be overwhelming. This total route score may be processed and published to end users such that users have a better idea of just how correct a particular route is that they may be interested in driving. The total route score may be viewed alone on a map, in a mapping application, or in a navigation application.

In one embodiment, an end user wishes to determine the quality of the map data in a database, and uses a mobile application to open a mapping or navigation application. The mobile mapping or navigation application receives traffic data for a region of interest. The mapping or navigation application matches the test data to routes formed from road links stored in a database. The mapping or navigation application may assign frequency weights to the test data based on a frequency of usage for the road links. The mapping or navigation application may perform a comparison of routes in the database to the traveled routes in the test data. The application may identify one or more errors in the database based on the comparison. The mapping or navigation application may calculate a total route score for the region of interest based on the errors and frequency weights.

In another embodiment, a non-transitory computer readable medium is operable to execute instructions for calculating a total route score to measure quality of map content. The instructions when executed receive test data for a designated region, match test data to routes composed of link segments, wherein both the routes and link segments are stored in a database, assign frequency weights to the test data based on the route frequency, compare the test data to the routes, identify errors in the database based on the comparison, and calculate a total route score for the designated region based on the errors and weights.

Figure 1:
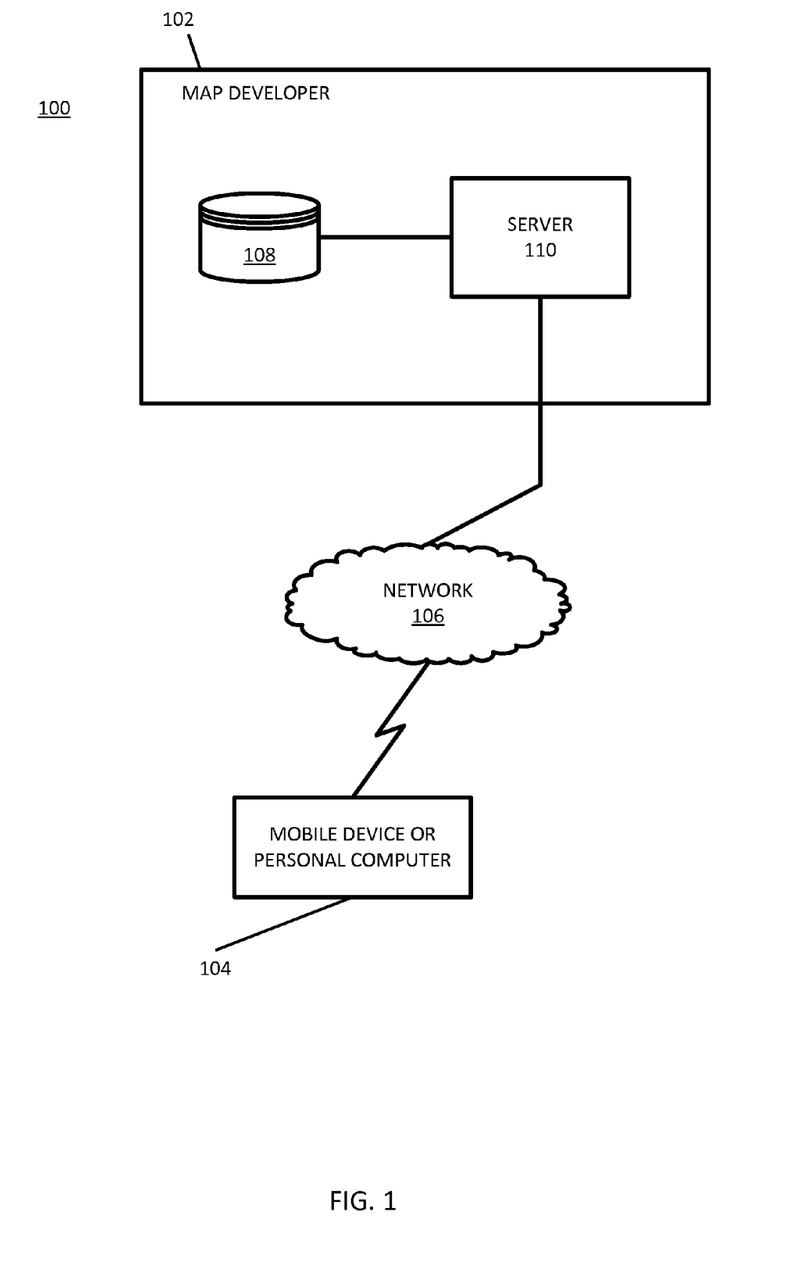
FIG. 1 illustrates an example system for calculating a total route score to measure the quality of map content.

FIG. 1 illustrates an example system 100 for calculating a total route score to measure map content quality. The system 100 includes a developer system 102, one or more mobile devices or personal computers 104, hereinafter "mobile device", and a network 106. Additional, different, or fewer components may be provided. For example, many mobile devices 104 connect with the network 106. The developer system 102 includes a server 110 and one or more databases.

Figure 2:
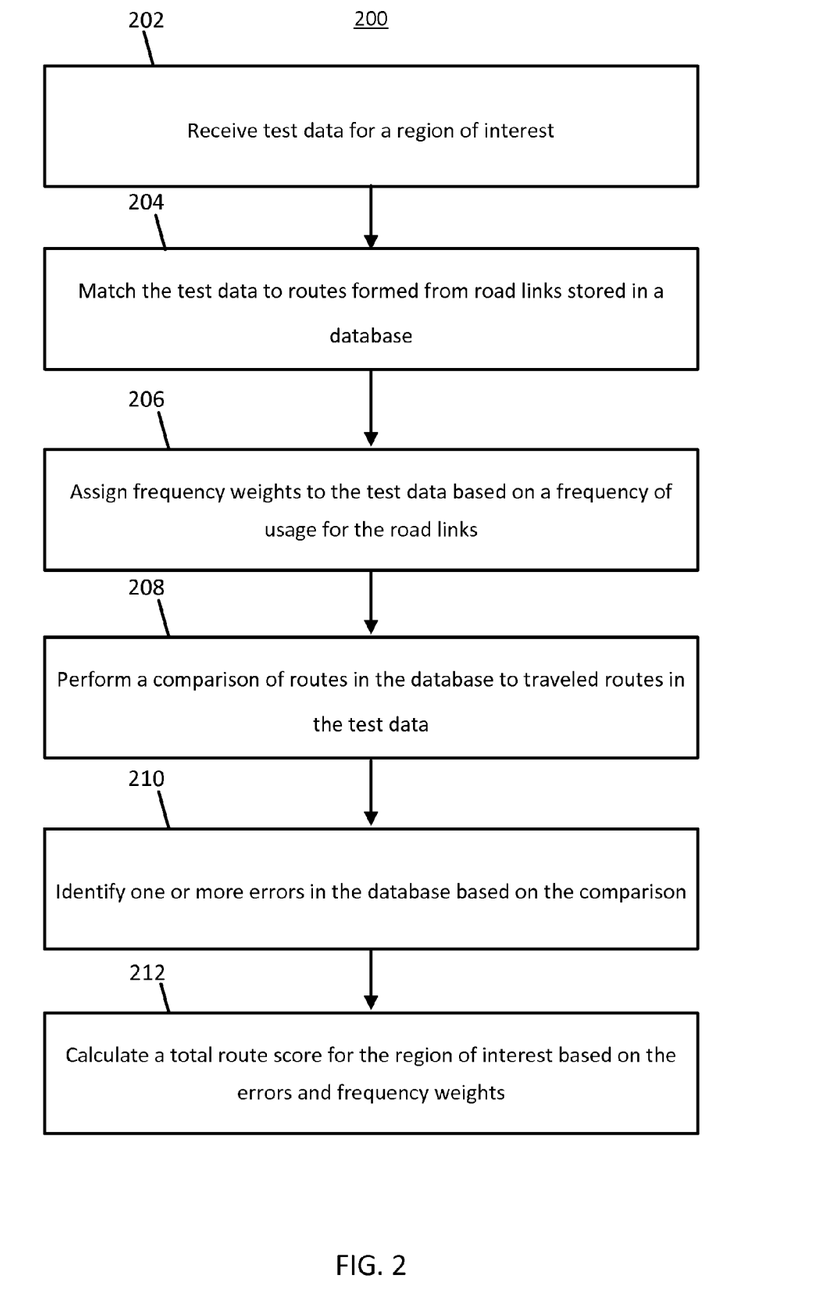
FIG. 2 illustrates an example flowchart for calculating a total route score to measure the quality of map content.

FIG. 2 illustrates an example flowchart of a method that may be used to calculate the total route score using the system of FIG. 1. The acts may be applied in a different order. Acts may be omitted or repeated. Additional acts may be added.

Database 108 may be a geographic database that stores traffic data collected from one or more mobile devices 104, or traffic data stored in the database 108 as part of the map developer system 102. The traffic data may include test data, real world testing ("RWT") data, or historical traffic data that are stored in a table in the database 108. Real world testing may refer to data collected by a vehicle, or individual, driving the routes in the real world to collect data. The test data may correspond to a particular area, or tested area, that a user of the system wishes to receive information about the links in the tested area. Similarly, the traffic data may include real-time traffic data that are stored in a table in the database 108. The traffic data stored in the database 108 may be data related to one or more vehicles traveling along a route or routes. A user of the system may indicate that they wish to receive traffic data on a particular region of interest that the user indicates, such as a city, county, state, or country. The traffic data may be related to the types of routes in the region of interest. The test data may include the number of times a road is selected as a destination, the number of routes onto a road, the number of routes off a road, or other combinations thereof.

Data collected from the mobile device 104 may be sent to the server 110 through the network 106 by the mobile device 104. The server 110 receives test data for a region of interest, for example in act 202 of FIG. 2. The received test data may include location data collected by probes (e.g., mobile device 104) paired with timestamps. The location data may be analyzed to determine attributes that describe a road. Some attributes may be calculated from the location data (e.g., speed, dimensions of the road), and others may be approximated by the location data (e.g., speed limit, road conditions, functional classification). The attributes may include any combination of the speed limit on the road, the length of the road, the width of the road, the address for the road, the directionality of the road, the geometry of the road, existence of restricted driving maneuvers (e.g. no left turn, no U-turn), the functional classification of the road, the priority of the road, the elevation of the road, the type of road, information about road lines, the average speed, the existence of dividers, the surface type, the condition of the road, construction status, road access, segment usage, grade levels, bicycle and pedestrian access, the address range, or other combinations thereof. Additional attributes known in the art may be used.

After the data is received the server 110 may filter the data. The filtering may consist of dropping particular types of routes. For example, the test data may be collected by an automobile for validating automobile routes stored in the database. In that case, the server 110 may filter out non-automobile routes such as routes for walking or driving a truck. Similarly, the server 110 may filter out testing route data that is used to test the database 108 or other route data that does not correspond to routes traversed in the collection of the data. Additionally, the server 110 may filter out other data in the database from testing other applications.

The server 110 may match the received test data to routes formed from road links stored in the database 108, for example in act 204 of FIG. 2. The test data for the region of interest may be for a city, a county, a state, or a country. The region of interest may be selected through a user input.

The routing data may be downloaded for the region of interest of a variable time span. The time span may be a year, multiple years, a month, a week, or some other time period. A longer time span allows for seasonal idiosyncrasies to be accounted for. For example, in the summer in Chicago Wrigley Field may be a more popular destination than it is during the winter because no baseball is played during the winter. The routes may correspond to routes in the region of interest. The routes may have particular attributes that align with the attributes for the test data. The routing data may be in x, y coordinate pairs. In other embodiments the routing data is in origin, destination pairs. The routing data is then converted into road link segments. That is, the routing data is converted from a pair of coordinates, or origin and destination names, to a series of road links. The origin destination pairs may include multiple routes from each origin to destination. Each of the routes may be composed of individual road link segments. In some embodiments, the mobile device may match the test data to the route data.

The server 110 may assign frequency weights to the test data based on a frequency of usage for the road links, for example in act 206 of FIG. 2. In some embodiments, once all of the testing data has been converted into the correct links (so that the RWT data are aligned with the road links as they exist in the database) the system may weight each permanent virtual id ("PVID"). A permanent virtual id may be an identifier used in the database 108 to identify a particular road link. Each link may be weighted according to frequency of occurrence in the database. The measured frequencies may be destination selection, routing entering new roads, and routing leaving current roads, or some combination thereof.

A destination selection weight is based on a number of times that a location, address, or other map point of interest, has been selected as the destination for the route in the system. A routing entering new roads weight may be proportional to a number of times drivers enter onto a particular road link from other road links. A routing leaving current roads weight may be based on a number of times people exit off of a particular road link to other road links. Other frequency weights may be used.

The destination selection may be different than the most traveled links. For example, Chicago O'Hare International Airport may be the most selected destination in the Chicago region, but Interstate Highway 90 may be the link with the highest amount of people entering a link, because so many people have to travel I-90 to get from place to place. In some embodiments, the frequency weights may be impacted in part by attributes for each link such as whether or not turning onto or off of a particular is possible. In the event that a link is omitted or missing from the database (e.g. the link exists in the testing data, but not in the database) the system uses statistical imputation to fill in the gaps. Statistical imputation may refer to replacing missing data in a dataset with substituted values. The substituted values may be computed with reference to the surrounding values in the dataset. The server 110 is configured to identify an omitted road link included in the test data that is omitted from the database and calculate a weight assigned to the omitted road link is based on surrounding links. In some examples, the attributes of the surrounding links are average. The surrounding links may be all connected links. The surrounding links may be a predetermined number of the closest links of the same road. In some examples, an omitted road link is substituted with an adjacent link (e.g., downstream link or upstream link).

In some examples, weights are set to the median of weights in the relevant cluster of links and incremented by 1 for stability to avoid the existence of 0 values in the database. In one embodiment, there may be a misalignment in attributes between the testing data and the routing data. In the event of a misalignment the server 110 may apply a discount to certain attributes. The discount helps to ensure that the attributes in both datasets are treated equally.

In one embodiment, the server 110 may stratify, categorize, or arrange the data by breaking it down into the corresponding functional class groups for each link. The links may be grouped by their functional class group. By stratifying the data the usage component of each link is put into better context. In this embodiment, the server 110 rebalances the data according to usage statistics. The server 110 may identify a functional classification for a selected road link and assign a road class weight or classification weight based on the functional classification.

The server 110, or in some embodiments the mobile device 104, is configured to account for one ways and other restricted driving maneuvers ("RDMs"). This is accomplished by applying a set of weights for these attributes at the link level. By applying weights for RDMs to the links the number of routes that travel through a RDM may be determined. The server 110 may be configured to identify a restricted driving maneuvers for a road link in the test data. The server 110 assigns a restriction weight based on the restricted driving maneuvers.

The server 110 may perform a comparison of routes in the database to traveled routes in the test data, for example in act 208 of FIG. 2. The comparison may analyze how closely a route in the testing data corresponds to the same route in the routing data. The comparison may take into account the frequency weights, as well as other attributes. The server 110 may identify errors in the database based on the comparison, for example in act 210 of FIG. 2. For example, the database may not indicate that there is no left turn at a particular intersection on a particular road link, but the testing data may show that there is no left turn at the intersection. This error would be identified and noted.

In one embodiment, the sever 110 may calculate a total route score for the region of interest based on the errors and frequency weights, for example in act 212 of FIG. 2. For example, the errors for frequently occurring links may account for a larger portion of the total route score than less frequently occurring links. The errors may be multiplied by coefficients based on frequency (e.g., (frequency for a link)/(total number of traversed links in the test data)). The product of the errors and the coefficients may be summed to calculate the total route score.

In one embodiment, the frequencies used for the total route score may be based on destination selection and may be calculated for the links in the region. In another embodiment, the frequencies used for the total route score may be based on routing entering new roads. In another embodiment, frequencies used for the total route score may be based on routing leaving current roads. In yet another embodiment, the frequency weights used in the calculation of the total route score may be a combination of destination selection, routing entering new roads, and routing leaving current roads. The total route score allows the user at a glance to see how accurate the links in the region are. Additionally, the total route score allows the user to know where mistakes in the database are occurring, i.e. where what is in the database doesn't match up with ground-truth. Ground-truth is what exists in the real world at a time or measurement. The testing data matches ground-truth at the time the testing data was collected.

In addition or in the alternative to the frequencies of destination selection, the frequencies based on routing entering new roads, and the frequencies based on routing leaving current roads, the server 110 may calculate the total route score as a function of the road class weights and/or the restricted driving maneuvers weights.

Figure 4:
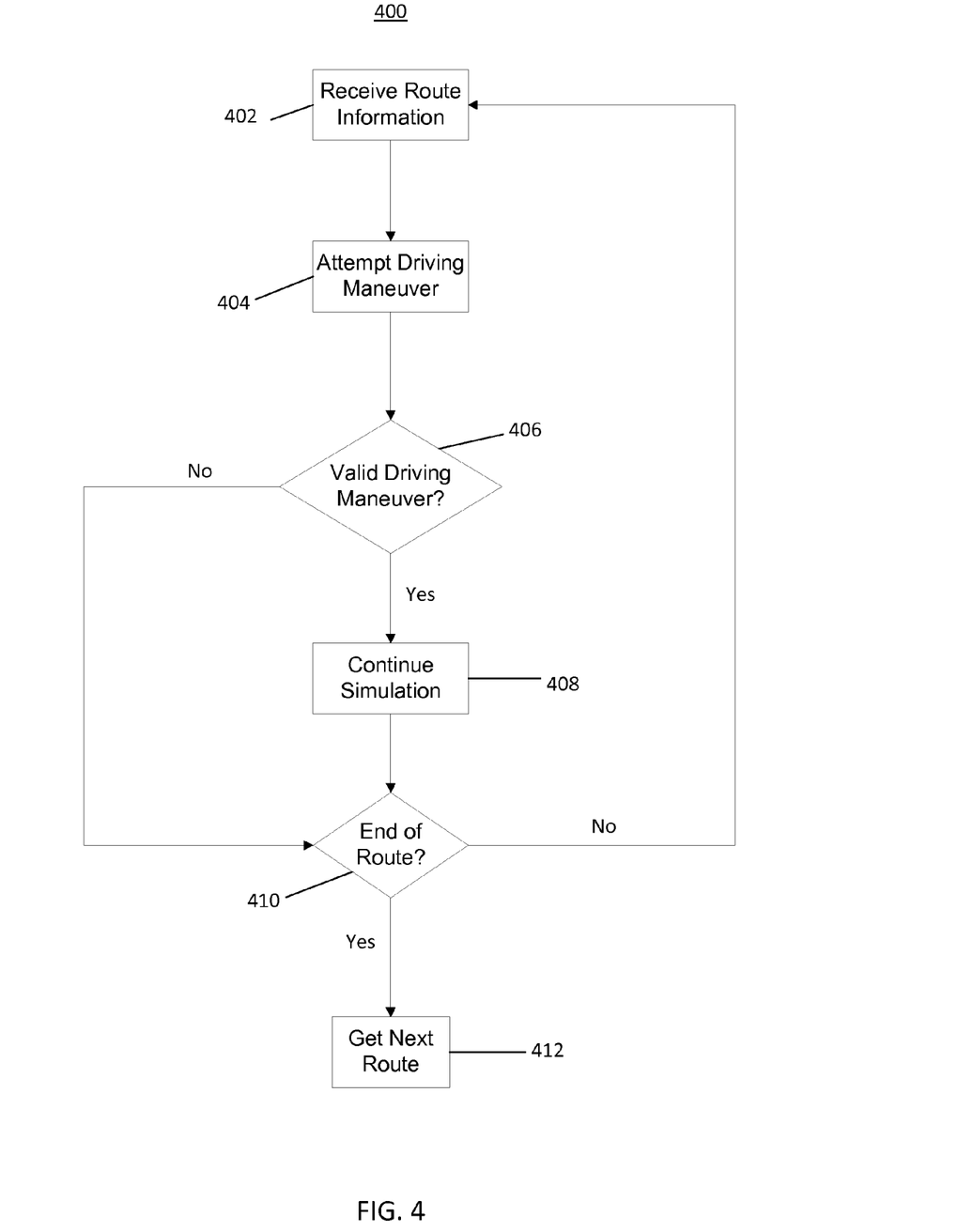
FIG. 4 illustrates an example simulation flowchart for simulating routes traveled.

In any of these embodiments, the server 110 may simulate all of the maneuvers in the route from origin destination pairs in order to identify errors. One such simulation process is depicted in FIG. 4. The success or failure of the maneuvers is tested against the testing data collected earlier. For example, the database may indicate that a particular set of maneuvers along a route would be valid, but after simulating the same set of maneuvers against the testing data it is clear that those maneuvers would not work for that route. This simulation result may be a part of how the total route score is calculated based off the simulation. The server 110, may also account for naming and address errors to avoid double counting. The total route score may be calculated by adding a destination selection metric to preliminary total route scores. The destination selection metric may be a number indicative of the success of origin destination pairs. The system may assign a confidence interval to the total route score. The confidence interval may be obtained by a regression model, or another statistical model.

The mobile device 104 may be a personal navigation device ("PND"), a portable navigation device smart phone, a mobile phone, a personal digital assistant ("PDA"), a tablet computer, a notebook computer, and/or any other known or later developed mobile device or personal computer. Non-limiting embodiments of navigation devices may also include relational database service devices, mobile phone devices, or car navigation devices.

The developer system 102 and the mobile device 104 are coupled with the network 106. The phrase "coupled with" is defined to mean directly connected to or indirectly connected through one or more intermediate components. Such intermediate components may include hardware and/or software-based components.

Figure 3:
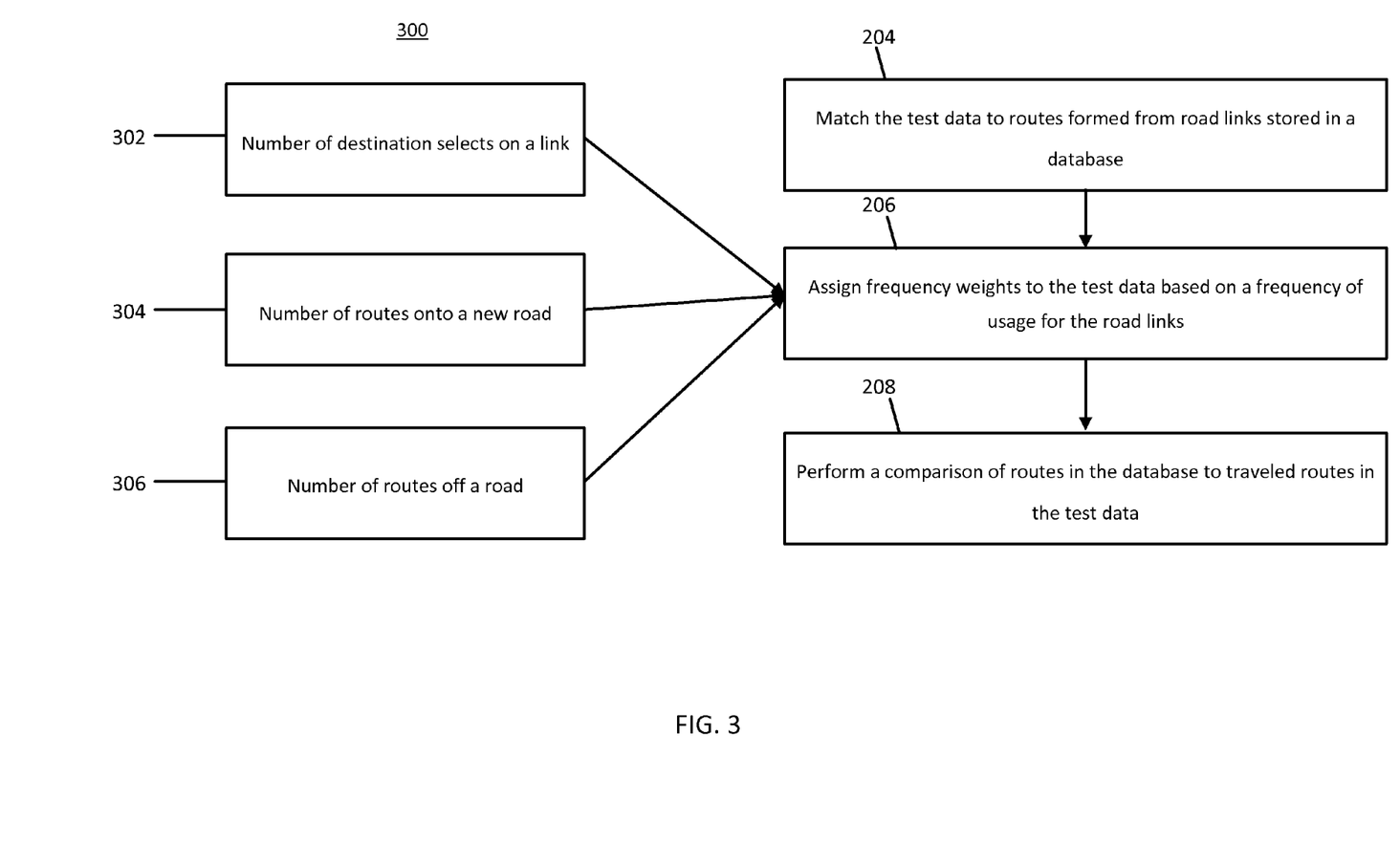
FIG. 3 illustrates an example weighting flowchart for assigning frequency weights to test data.

Computing resources for total route score to measure map quality may be divided between the server 110 and the mobile device 104. In some embodiments, the server 104 performs a majority of the processing for total route score to measure map quality. In other embodiments, the mobile device 104 performs a majority of the processing. In addition, the processing is divided substantially evenly between the server 110 and the mobile device 104. FIG. 3 illustrates an example process that may be used to calculate the frequency weights as used in the example method of FIG. 2. In FIG. 3, the frequency weights 300 may be a number of destination selects on a link 302, a number of routes onto a new road 304, and a number of routes off a road 306. In some embodiments one or more of the frequency weights 302-306 may be used. In other embodiments different frequency weights may be used. The frequency weights 302-306 may be used by the method illustrated in FIG. 2. In particular, at act 206 the method may assign the frequency weights 302-306 to the test data based on a frequency of usage for the road links.

Figure 8:
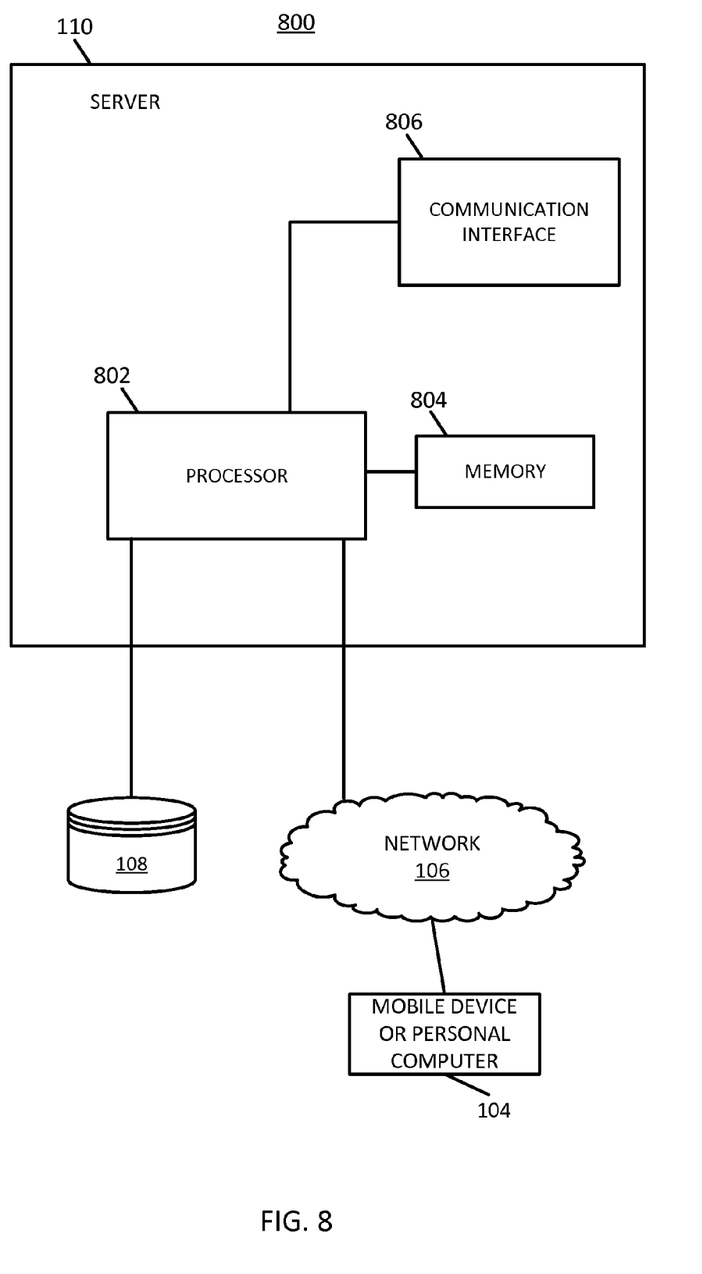
FIG. 8 illustrates an example server arrangement for calculating a total route score to measure the quality of map content.

FIG. 4 displays an example flowchart of a process for simulating routes stored in the database 108 of FIG. 1 or FIG. 8. The process may consist of receiving route information 402, attempting a driving maneuver 404, determining if the driving maneuver is a valid driving maneuver 406, continue the simulation 408, determining if the end of the route is reached 410, and fetching a new route 412. At act 402, the server 110 of FIG. 1, receives route information from the routing data. The route information may be composed of a series of road links and driving maneuvers which allow an individual to travel from origin to destination. At act 404, the server 110 of FIG. 1, attempts a driving maneuver on one of the road links that compose the route. At act 406, the server determines if the driving maneuver is a valid driving maneuver. The determination may take place by consulting local driving laws, checking to see if the attempted driving maneuver would result in a restricted driving maneuver, or other attributes to determine if the driving maneuver is valid. If the maneuver is not valid, the simulation may check to see if the end of the route 410 has been reached. If the maneuver is valid then the simulation continues at act 408. At act 410, the simulation checks if the route has finished, if not then the simulation proceeds to act 402 and receives additional route information, if it is the end of the route then the simulation retrieves the next route at act 412. The acts 402-412 may be used to count any potential errors in the route data. The existence of invalid driving maneuvers may be detected during the simulation 400.

Figure 5:
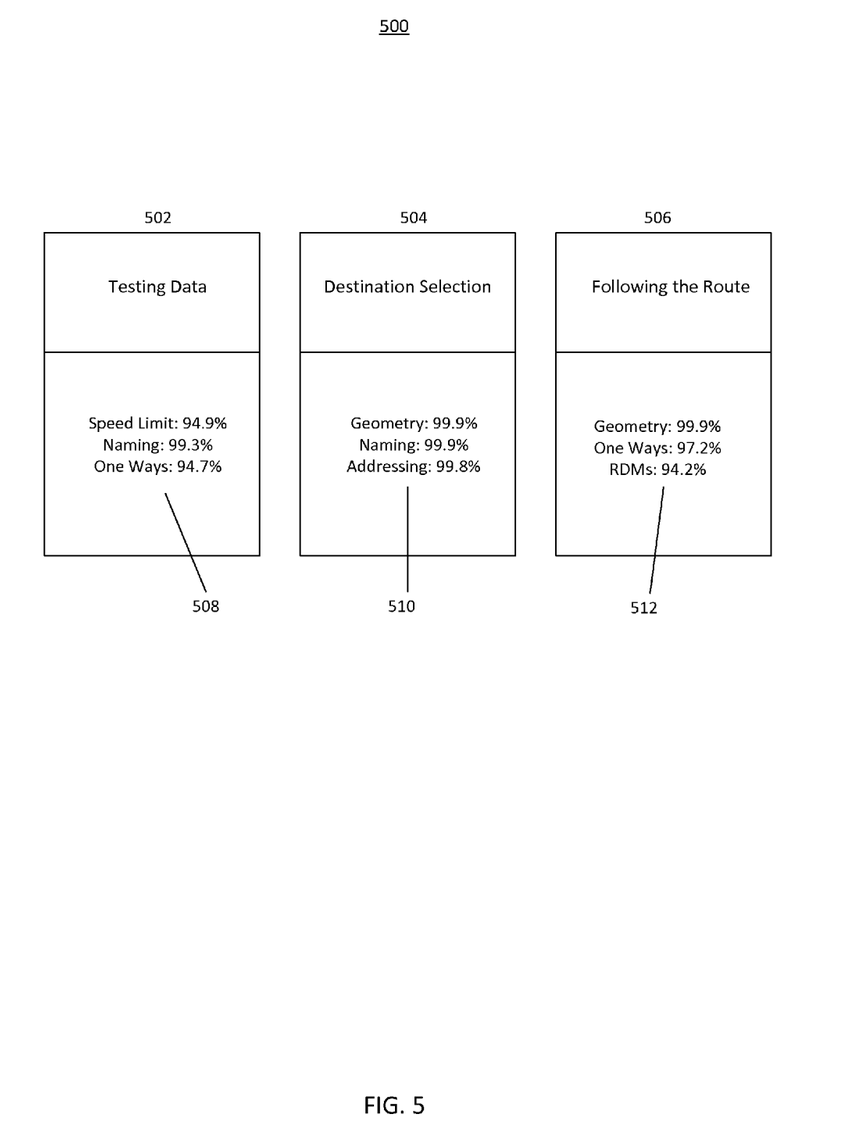
FIG. 5 illustrates an example total route score presented to a user.

FIG. 5 illustrates an example display 500 of total route scores. The display 500 may consist of total route scores for testing data 502, destination selections 504, and following the route 506. The testing data 502 may refer to data collected by the RWT testing as explained with respect to FIG. 1. In 508, the total route score for three attributes in the testing data set 502, which may be the testing data as explained with respect to FIG. 1, shows a total route score of 94.9% for speed limit attributes in the testing data, 99.3% for naming attributes in the testing data, and 94.7% for one ways in the testing data. The total route score may function as a percent correct for that attribute in that dataset. For example, what this means is that 94.9% of the road links stored in the database are correct when compared to the testing data. Similarly, the destination selection 504 and following the route 506 may have the total route scores as shown in 510 and 512. Other attributes other than the ones shown in 508-512 may be used. For example, any of the following attributes may have a total route score calculated for it: the speed limit on the road, the length of the road, the width of the road, the address for the road, the directionality of the road, the geometry of the road, existence of restricted driving maneuvers (e.g. no left turn, no U-turn), the functional classification of the road, the priority of the road, the elevation of the road, the type of road, information about road lines, the average speed, the existence of dividers, the surface type, the condition of the road, construction status, road access, segment usage, grade levels, bicycle and pedestrian access, the address range, or other combinations thereof. Additional attributes known in the art may be used.

The following calculations may be used to calculate a total route score from testing data and routing data. The total route score may be measured as a percentage and calculated according to the following equation:

$$TRS=3.00\%-FAIL_{destination}-FAIL_{route} \quad (Eq. 1)$$

TRS is the total route score of the routing use case in the tested area, based on map content accuracy; $FAIL_{destination}$ is the estimated destination selection failure rate; and $FAIL_{route}$ is the estimated following the route failure rate. Other equations may be used for calculating the total route score. The total route score and estimated failure rates for $FAIL_{destination}$ and $FAIL_{route}$ may be calculated using the server 110 or mobile device 104 of FIG. 1.

For $FAIL_{destination}$ the following equation may be used:

$$FAIL_{destination}=FAIL_{road1}+FAIL_{name}+FAIL_{address}-FAIL_{name\_AND\_address} \quad (Eq. 2)$$

$FAIL_{road1}$ is the estimated failure rate of the road not being geometrically present; $FAIL_{name}$ is the estimated failure rate of the street name not being correct on roads that are geometrically correct; $FAIL_{address}$ is the estimated failure rate of the address range not being correct on roads that are geometrically correct; and $FAIL_{name\_AND\_address}$ is the estimated failure rate of both street name and address range not being correct on roads that are geometrically correct. The estimated failure rates for the FAIL terms listed above may be calculated using the server 110 or mobile device 104 of FIG. 1. In the equations and explanations that follow "FC" means the functional class of a road (e.g arterial, collector, local). For each term above, $FAIL_{road1}$ as an example:

$$FAIL_{road1}=\Sigma_i w_i e_i (Eq. 3)$$

i indexes the FC assignment; $w_i$ is the proportion of weights on the particular FC over all FCs; and $e_i$ is the proportion of ground-truth errors in testing data, where $e_i$ is:

$$e_i=(\Sigma v/\Sigma V)_i \quad (Eq. 4)$$

v is the collection of all selection usage weights on links with errors; and V is the collection of all selection usage weights. When applicable, selection usage weights are imputed from usage weights on neighboring roads.

For $FAIL_{route}$ the following equation may be used:

$$FAIL_{route}=FAIL_{road2}+FAIL_{direction}+FAIL_{maneuver} \quad (Eq. 5)$$

$FAIL_{road2}$ is the estimated failure rate of the road not being geometrically correct; $FAIL_{direction}$ is the estimated failure rate of the road directionality not being correct on roads that are geometrically correct; and $FAIL_{maneuver}$ is the estimated failure rate of the road maneuver legality/possibility not being correct on roads that are geometrically correct. Each "FAIL" term above used to calculate $FAIL_{route}$ may be calculated from the route simulation, as depicted in FIG. 4, where each attempted maneuver has assigned probabilities of: $P_{maneuver\_FCoff}$ is the probability of a restricted driving maneuver occurring in reality when maneuvering off the current functional class; $P_{direction\_FCon}$ is the probability of a road with non-trivial directionality occurring in reality when maneuvering onto a functional class; $E_{maneuver\_FCoff}$ is the error rate of the restricted driving maneuver when maneuvering off the current functional class; $E_{road2\_FCon}$ is the error rate of the route geometry when maneuvering onto a functional class; and $E_{direction\_FCon}$ is the error rate of the directionality of non-trivial directional roads when maneuvering onto a functional class. For each "P" term above, using $P_{maneuver\_FCoff}$ as example:

$$P_{maneuver\_FCoff}=N_{maneuver\_FCoff}/N_{maneuver\_FCtotal} \quad (Eq. 6)$$

$N_{maneuver\_FCoff}$ is the estimated total number of restricted maneuvers off the current FC in the tested area; and $N_{maneuver\_FCtotal}$ is the estimated total number of maneuvers possible off the current FC in the tested area. The $N_{maneuver}$ terms above may be derived from analyzing the testing data. For each 'E' term above, using $E_{maneuver\_FCoff}$ as example:

$$E_{maneuver\_FCoff}=\Sigma_i w_i e_i \quad (Eq. 7)$$

i indexes the FC assignment; $w_i$ is the proportion of maneuver weights on the particular FC over all FCs; and $e_i$ is the proportion of ground-truth errors collected using the RWT process, where:

$$e_i=(\Sigma v/\Sigma V)_i, \quad (Eq. 8)$$

i indexes the FC assignment; v is the collection of all maneuver uses on links with errors; and V is the collection of all maneuver uses.

Figure 6:
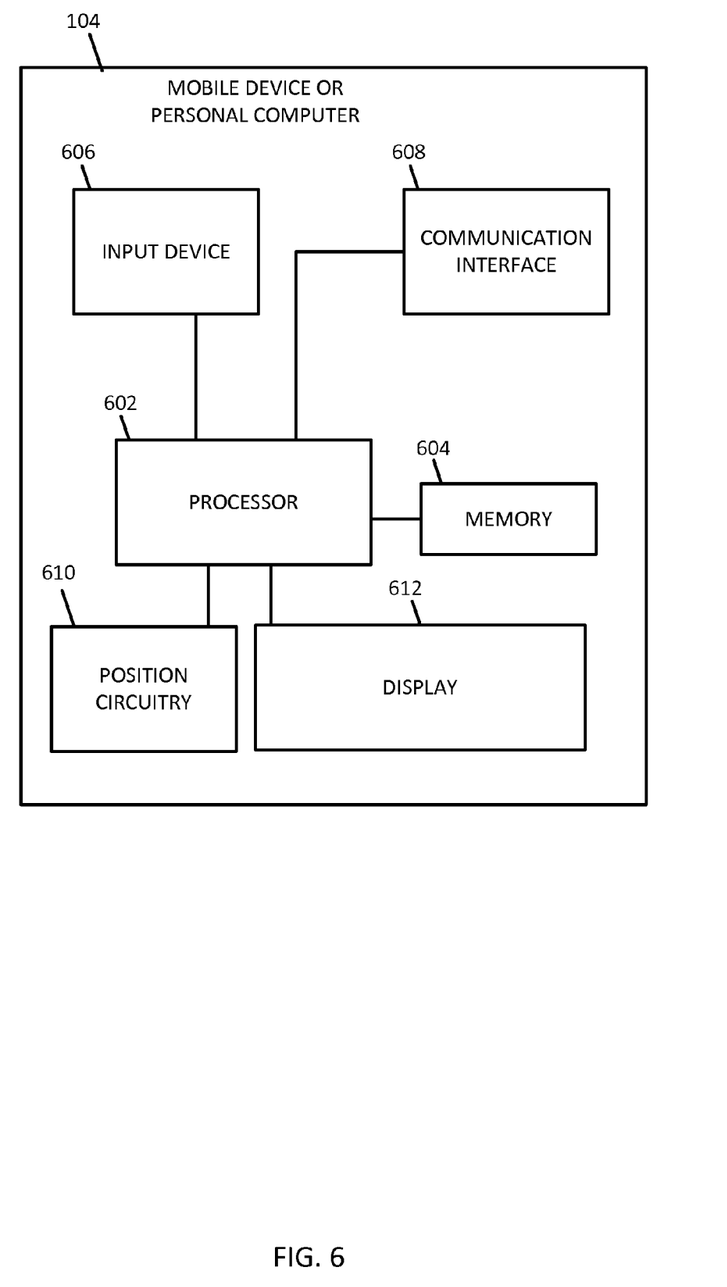
FIG. 6 illustrates an example mobile device.
Figure 7:
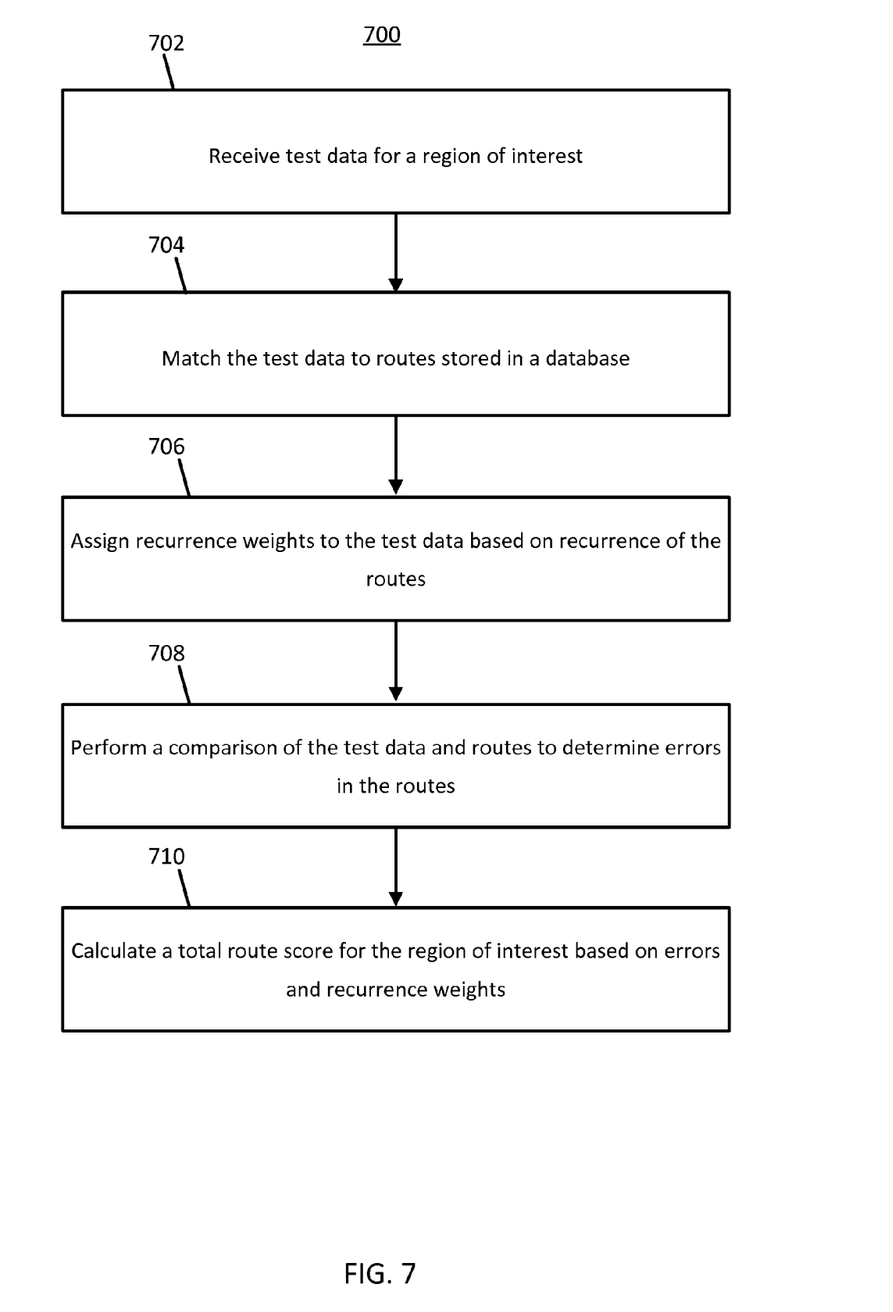
FIG. 7 illustrates an example flowchart for calculating a total route score to measure the quality of map content.

FIG. 6 illustrates an exemplary mobile device 104 of the system of FIG. 1. The mobile device 104 includes a processor 602, a memory 604, an input device 603, a communication interface 608, position circuitry 610, and a display 912. Additional, different, or fewer components are possible for the mobile device/personal computer 104. FIG. 7 illustrates an example flowchart for calculating a total route score. The acts may be applied in a different order. Acts may be omitted or repeated. Additional acts may be added. The memory 604 may store the historical traffic data, real time traffic data, past traffic surprises, or some combination thereof. The mobile device 104 may be a personal device such as a mobile phone equipped with position circuitry (e.g., global positioning system (GPS)) and an inertial measurement unit (IMU).

The position circuitry 610 generates data indicative of the location of the mobile device 104 ("position data"). In addition or in the alternative to GPS, the position circuitry may include a dead reckoning-type system, cellular location, or combinations of these or other systems. The positioning circuitry may include suitable sensing devices that measure the traveling distance, speed, direction, and so on, of the mobile device 104. The positioning system may also include a receiver and correlation chip to obtain a GPS signal.

At act 702, the processor 602 or the communication interface 708 may be configured to receive test data for a region of interest. The data may be collected by the position circuitry 610, the input device 606, a GPS, or other collection device integrated with the mobile device 104. The subsequent test data may be any one or combination of attributes such as the speed limit on the road, the length of the road, the width of the road, the address for the road, the directionality of the road, the geometry of the road, existence of restricted driving maneuvers (e.g. no left turn, no U-turn), the functional classification of the road, the priority of the road, the elevation of the road, the type of road, information about road lines, the average speed, the existence of dividers, the surface type, the condition of the road, construction status, road access, segment usage, grade levels, bicycle and pedestrian access, the address range, or other combinations thereof. Additional attributes known in the art may be used. At act 704, the processor 602 may match the test data to routes stored in a database.

At act 706, the processor 602 assigns recurrence weights to the test data based on recurrence of routes. The processor may perform this step in conjunction with the memory 604. The weights may be predetermined by the system, the user, or a third party, or some combination thereof. The weights may be entered into the system by the user through the use of the input device 606.

At act 708, the processor 602 performs a comparison of the test data and routes to determine errors in the routes. The errors may be indicative of the absence of a road, the absence of an attribute in the database but in the testing data, or some combination thereof.

At act 710, the processor 602 calculates a total route score for the region of interest based on the errors and the recurrence weights. The total route score may represent correctness of a particular attribute in the region of interest.

Figure 9:
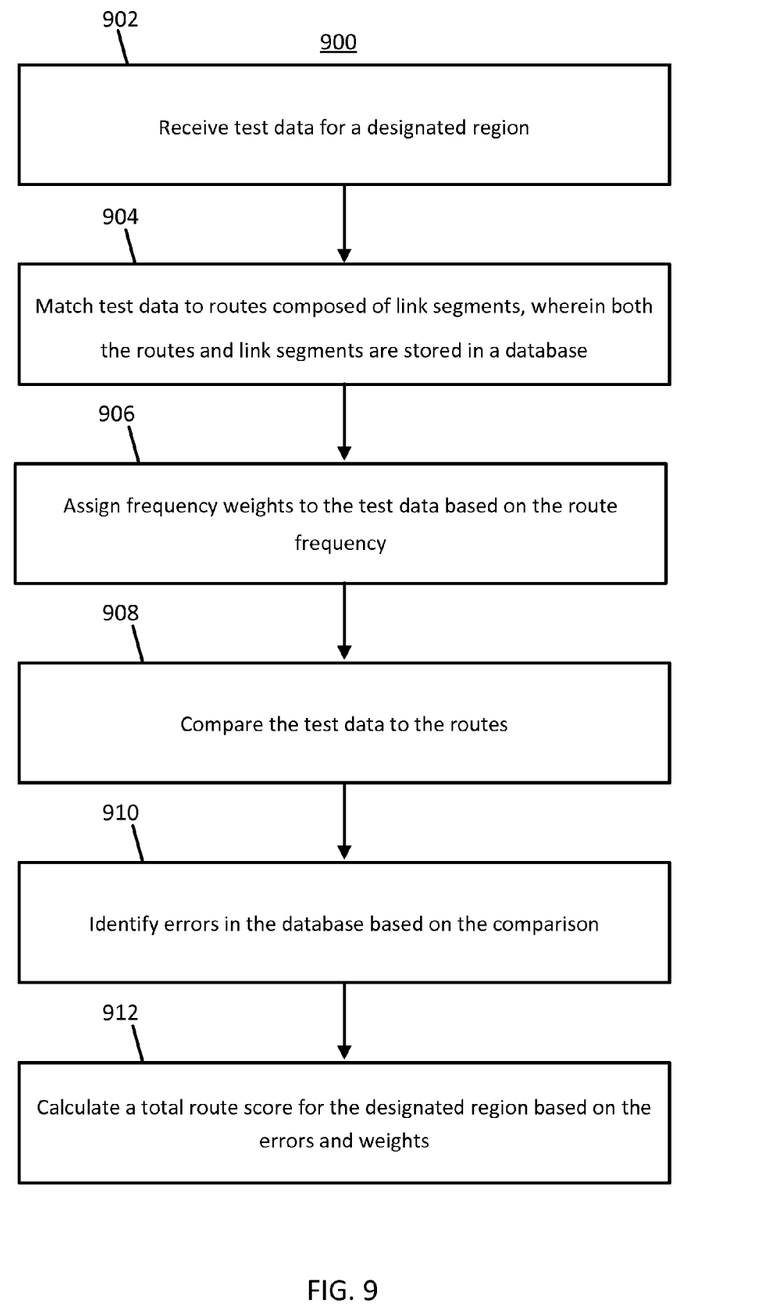
FIG. 9 illustrates an example flowchart for calculating a total route score to measure the quality of map content.

FIG. 8 illustrates an example network device (e.g., server 110) of the system of FIG. 1. The server 110 includes a processor 802, a communication interface 806, and a memory 804. The server 110 may be coupled to a database 108 and a mobile device 104. The mobile device 104 may be used as an input device for the server 110. In addition, the communication interface 806 is an input device for the server 110. In certain embodiments, the communication interface 806 may receive data indicative of user inputs made via the mobile device 104. FIG. 9 illustrates an example flowchart for calculating total route score to measure quality of map content. The acts of the flowchart of FIG. 9 may alternatively be performed by the server 110, or a group of servers. Different, fewer, or additional acts may be included.

At act 902, the processor 802 or communication interface 806 receives test data for a designated region through a network 106. At act 904, the processor 802 matches test data to routes composed of link segments, wherein both the routes and link segments are stored in a database.

At act 906, the processor 802 may assign frequency weights to the test data based on the route frequency. The weights may be predetermined by the system, the user, or a third party, or some combination thereof. The weights may be entered into the system by the user through the use of the mobile device 104.

At act 908, the processor 802 compares the test data to the routes. The comparison may be done at a link by link level or at a route by route level or some combination thereof. In act 910, processor 802 identifies errors in the database based on the comparison. The errors may correspond to the existence or absence of particular link segment attributes, or link segments. In act 912, the processor 802 calculates a total route score for the designated region based on the errors and weights.

In addition to the data describe above, the database 108 may include node data records, road segment or link data records, POI data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geocoding techniques).

The road segment data records are links or segments representing roads, streets, or paths, as can be used in the calculated route or recorded route information for determination of one or more personalized routes, according to exemplary embodiments. The node data records are end points corresponding to the respective links or segments of the road segment data records. The road link data records and the node data records represent a road network, such as used by vehicles, cars, and/or other entities. Alternatively, for example, the database 108 may contain path segment and node data records or other data that represent pedestrian paths or areas in addition to or instead of the vehicle road record data.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The database 108 may include data about the POIs and their respective locations in the POI data records. The database 108 can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the database 108 can include event data (e.g., traffic incidents, constructions, scheduled events, unscheduled events, etc.) associated with the POI data records or other records of the database 108.

Each road segment is associated with two nodes (e.g., one node represents the point at one end of the road segment and the other node represents the point at the other end of the road segment). The node at either end of a road segment may correspond to a location at which the road meets another road, i.e., an intersection, or where the road dead-ends. The road segment data record may also include data that indicate a classification, such as a rank of a road segment that may correspond to its functional class. Example functional classes include arterial roads, collector roads, and local roads. The prerecorded path may include roads outside of the functional classification system. Alternatively, an additional functional classification (e.g., private roads, temporary roads, or personalized roads) may be added to the geographic database to distinguish the prerecorded paths from other segments. Incident rates may be assigned to road segments based on functional classification.

The database 108 may be maintained by a content provider (e.g., a map developer). By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The computing device processor 602 and/or the server processor 802 may include a general processor, digital signal processor, an application specific integrated circuit (ASIC), field programmable gate array (FPGA), analog circuit, digital circuit, combinations thereof, or other now known or later developed processor. The mobile device processor 602 and/or the server processor 802 may be a single device or combinations of devices, such as associated with a network, distributed processing, or cloud computing. The computing device processor 602 and/or the server processor 802 may also be configured to cause an apparatus to at least perform at least one of methods described above.

The memory 604 and/or memory 804 may be a volatile memory or a non-volatile memory. The memory 604 and/or memory 804 may include one or more of a read only memory (ROM), random access memory (RAM), a flash memory, an electronic erasable program read only memory (EEPROM), or other type of memory. The memory 604 and/or memory 804 may be removable from the mobile device 104, such as a secure digital (SD) memory card.

The communication interface 608 and/or communication interface 806 may include any operable connection. An operable connection may be one in which signals, physical communications, and/or logical communications may be sent and/or received. An operable connection may include a physical interface, an electrical interface, and/or a data interface. The communication interface 608 and/or communication interface 806 provides for wireless and/or wired communications in any now known or later developed format.

In the above described embodiments, the network 106 may include wired networks, wireless networks, or combinations thereof. The wireless network may be a cellular telephone network, an 802.11, 802.16, 802.20, or WiMax network. Further, the network 106 may be a public network, such as the Internet, a private network, such as an intranet, or combinations thereof, and may utilize a variety of networking protocols now available or later developed including, but not limited to TCP/IP based networking protocols.

While the non-transitory computer-readable medium is described to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term "circuitry" or "circuit" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., E PROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
 receiving real time test data collected by one or more probes in a region of interest, wherein the real time test data includes routes traveled by the one or more probes;
 receiving a plurality of historic routes formed from road links stored in a map database;
 matching the routes traveled by the one or more probes to road links from the plurality of historic routes stored in the map database;
 assigning frequency weights to road links on a frequency of usage for the road links from the plurality of historic routes;
 performing a comparison of the plurality of historic routes in the map database to the routes traveled by the one or more probes;
 identifying one or more errors in the map database based on the comparison;
 calculating a total route score for the region of interest based on the errors and frequency weights; and
 providing the total route score for a route with a navigation application as an indication of a correctness of the route.

2. The method of claim 1, further comprising:
 identifying a functional classification; and
 assigning road class weights based on the functional classification, wherein the total route score is based on the road class weights.

3. The method of claim 2, wherein the functional classification is selected from arterial roads, collector roads, and local roads.

4. The method of claim 1, further comprising:
 identifying a restricted driving maneuver; and
 assigning restriction weights based on the restricted driving maneuver, wherein the total route score is based on the restricted weights.

5. The method of claim 4, wherein restricted driving maneuvers are used to determine the errors.

6. The method of claim 1, wherein performing a comparison further comprises:
 performing a simulation for routes formed from road links stored in the map database; and
 calculating a route score based on the simulation.

7. The method of claim 6, further comprising:
 repeating the simulation to calculate route scores for the routes formed from the map database; and
 aggregating the route scores as the total route score.

8. The method of claim 7, further comprising:
 assigning a confidence interval to the total route score.

9. The method of claim 1, further comprising:
 identifying an omitted road link included in the route for the origin and destination pair that is omitted from the map database; and
 wherein a weight assigned to the omitted road link is based on surrounding links.

10. An apparatus comprising:
 at least one processor; and
 at least one memory including computer program code for one or more programs; the at least one memory and the computer program code configured to, with the at least one processor, cause the apparatus to at least perform:
 receive real time testing data for a plurality of traveled routes including a route in a region of interest;
 receive a plurality of historic routes formed from road links stored in a map database;
 match the route from the plurality of traveled routes to at least one of the plurality of historic routes;
 assign recurrence weights to road links in the route from the plurality of traveled routes based on recurrence of the road links in the historic routes;
 perform a comparison of the plurality of historic routes to the route from the plurality of traveled routes to determine errors;
 calculate a total route score for the region of interest based on the errors and recurrence weights; and
 provide the total route score with a navigation application.

11. The apparatus of claim 10, wherein the computer program code configured to, with the at least one processor, cause the apparatus to:
 identify a functional classification; and
 assign classification weights based on the functional classification, wherein the total route score is based on the classification weights.

12. The apparatus of claim 11, wherein the functional classification is selected from arterial roads, collector roads, and local roads.

13. The apparatus of claim 10, wherein the computer program code configured to, with the at least one processor, cause the apparatus to:
 identify restricted driving maneuvers; and
 assign restriction weights based on the restricted driving maneuvers, wherein the total route score is based on the restricted driving maneuvers weights.

14. The apparatus of claim 13, wherein the restricted driving maneuvers are used to determine the errors.

15. The apparatus of claim 10, wherein the computer program code configured to, with the at least one processor, cause the apparatus to:
 perform a simulation of routes formed from road links stored in the map database; and
 calculate a route score based on the simulation.

16. The apparatus of claim 15, wherein the computer program code configured to, with the at least one processor, cause the apparatus to:
 repeat the simulation to calculate route scores for a plurality of routes formed from the database; and
 aggregate the route scores as the total route score.

17. The apparatus of claim 10, wherein the computer program code configured to, with the at least one processor, cause the apparatus to:
 identify an omitted road link included in the route from the origin and destination pair that is omitted from the map database, wherein a weight assigned to the omitted road link is based on surrounding links.

18. A non-transitory computer readable medium comprising instructions that when executed are operable to:

receive real time test data for routes traveled by one or more probes in a designated region;
receive a plurality of historic routes formed from road links stored in a map database;
match the routes traveled in the designated region to historic routes composed of road segments, wherein both the historic routes and road segments are stored in a map database;
assign frequency weights to road links in the routes traveled in the designated region based on a route frequency in the historic routes;
perform a comparison of the plurality of historic routes in the map database to the routes traveled by the one or more probes;
identify errors in the map database for the routes traveled in the designated region based on the comparison;
calculate a total route score for the designated region based on the errors and frequency weights; and
provide the total route score in a navigation application.

19. The non-transitory computer readable medium of claim 18, the instructions configured to:
identify a functional classification for the road segments; and
assign road class weights based on the functional classification, wherein the total route score is based on the road class weights.

20. The apparatus of claim 19, wherein the functional classification includes arterial roads, collector roads, and local roads.

* * * * *